United States Patent
Sanso et al.

(10) Patent No.: US 10,594,749 B2
(45) Date of Patent: Mar. 17, 2020

(54) COPY AND PASTE FOR WEB CONFERENCE CONTENT

(71) Applicant: Adobe Inc., San Jose, CA (US)

(72) Inventors: Antonio Sanso, Allschwil (CH); Damien Antipa, Saint-Louis (FR)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/127,153

(22) Filed: Sep. 10, 2018

(65) Prior Publication Data

US 2019/0007469 A1 Jan. 3, 2019

Related U.S. Application Data

(63) Continuation of application No. 14/665,333, filed on Mar. 23, 2015, now Pat. No. 10,091,260.

(51) Int. Cl.
*H04L 29/06* (2006.01)
*H04L 29/08* (2006.01)
*G06F 17/24* (2006.01)

(52) U.S. Cl.
CPC ............ *H04L 65/403* (2013.01); *G06F 17/24* (2013.01); *H04L 65/607* (2013.01); *H04L 67/02* (2013.01)

(58) Field of Classification Search
CPC .................. G06F 9/4443; G06F 3/0481; G06F 17/30873; G06F 3/04817; H04L 29/0809; H04N 5/44543
See application file for complete search history.

(56) References Cited

U.S. PATENT DOCUMENTS

| | | |
|---|---|---|
| 2005/0204292 A1 | 9/2005 | Kililov |
| 2009/0089651 A1 | 4/2009 | Herberger |
| 2011/0138331 A1 | 6/2011 | Pugsley |
| 2011/0167354 A1 | 7/2011 | Raghunath |
| 2011/0307805 A1 | 12/2011 | Bastide |
| 2013/0006625 A1 | 1/2013 | Gunatilake |
| 2013/0290861 A1 | 10/2013 | Chen |
| 2014/0195899 A1 | 7/2014 | Bastide |
| 2015/0046294 A1 | 2/2015 | Lee |
| 2015/0301718 A1 | 10/2015 | Trollope |

OTHER PUBLICATIONS

Notice of Allowance from related U.S. Appl. No. 14/665,333 dated Jun. 4, 2018, 16 pages.

*Primary Examiner* — Toan H Vu
(74) *Attorney, Agent, or Firm* — Kilpatrick Townsend & Stockton LLP

(57) ABSTRACT

Techniques are disclosed for providing copy/paste support for web conference content. Methods and systems allow copy/paste operations in web conference sessions with multimedia content based on data extracted from conference content transmitted during the web conference. The web conference can connect clients for live sharing of documents, audio, video, applications such as web applications, and web pages. In one embodiment, a conference application can receive content from a first client participating in the web conference. The conference application can extract data items from the content. The conference application can store the extracted data items. The conference application can also receive, from a second client participating in the web conference, a selection of a portion of the conference content. The conference application can retrieve extracted data items corresponding to the selection, and then provide, via the web conference, to the second client participating in the web conference, the retrieved data items.

20 Claims, 9 Drawing Sheets

US 10,594,749 B2

COPY AND PASTE FOR WEB CONFERENCE CONTENT

CROSS-REFERENCE TO RELATED APPLICATIONS

This application is a continuation of U.S. patent application Ser. No. 14/665,333, filed on Mar. 23, 2015, now allowed, the contents of all of which are incorporated herein by reference.

TECHNICAL FIELD

This disclosure relates generally to computer-implemented methods and systems for sharing documents and other electronic content in web conference sessions and more particularly relates to providing clipboard functionality for transferring electronic content using a web conference application.

BACKGROUND

Online services such as web conference applications can allow clients at remote locations to share electronic content, such as electronic documents and web content. Web conferences can be used to conduct meetings and training events and/or present lectures or short presentations from any computer accessing a web conference. Web conference applications allow for online collaboration via webinars, interactive conferences, online workshops, web meetings, eLearning sessions, etc. Web conferences may also involve the exchange of data between various participants. Participants may communicate via text message, video chat, audio chat, etc.

Users may operate computing devices and use computing services, such as a web conferencing service, to share electronic content such as documents and presentation materials. In many situations, one of the users may be a host of an online conference and other users may be participants in the conference. The users may be in different locations. In some situations, users may wish to transfer portions of the electronic content to their computing devices. For example, a participant in a web conference may wish to copy and paste a portion of a document being presented by a host. Conventional web conference applications and services provide contents of a web meeting as a video stream. With these conventional web conference services, it is not possible for a conference participant to copy and paste a portion of the content to an application buffer or other local storage at their computing device.

SUMMARY

One embodiment involves receiving content from a first client participating in a web conference. The web conference connects multiple clients for live sharing of the content. The embodiment further involves analyzing the content to identify data items in the content and extracting the data items from the content. In one example, the extracted data items include text data. The embodiment further involves storing the extracted data items. In response to receiving a selection of a portion of the content, the embodiment retrieves extracted data items corresponding to the selection and provides the retrieved data items. In one example, the retrieved data items are provided to a clipboard that is accessible by a conference attendee. In this way, the embodiment enables copying and pasting of conference content.

These illustrative features are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Figure 1:
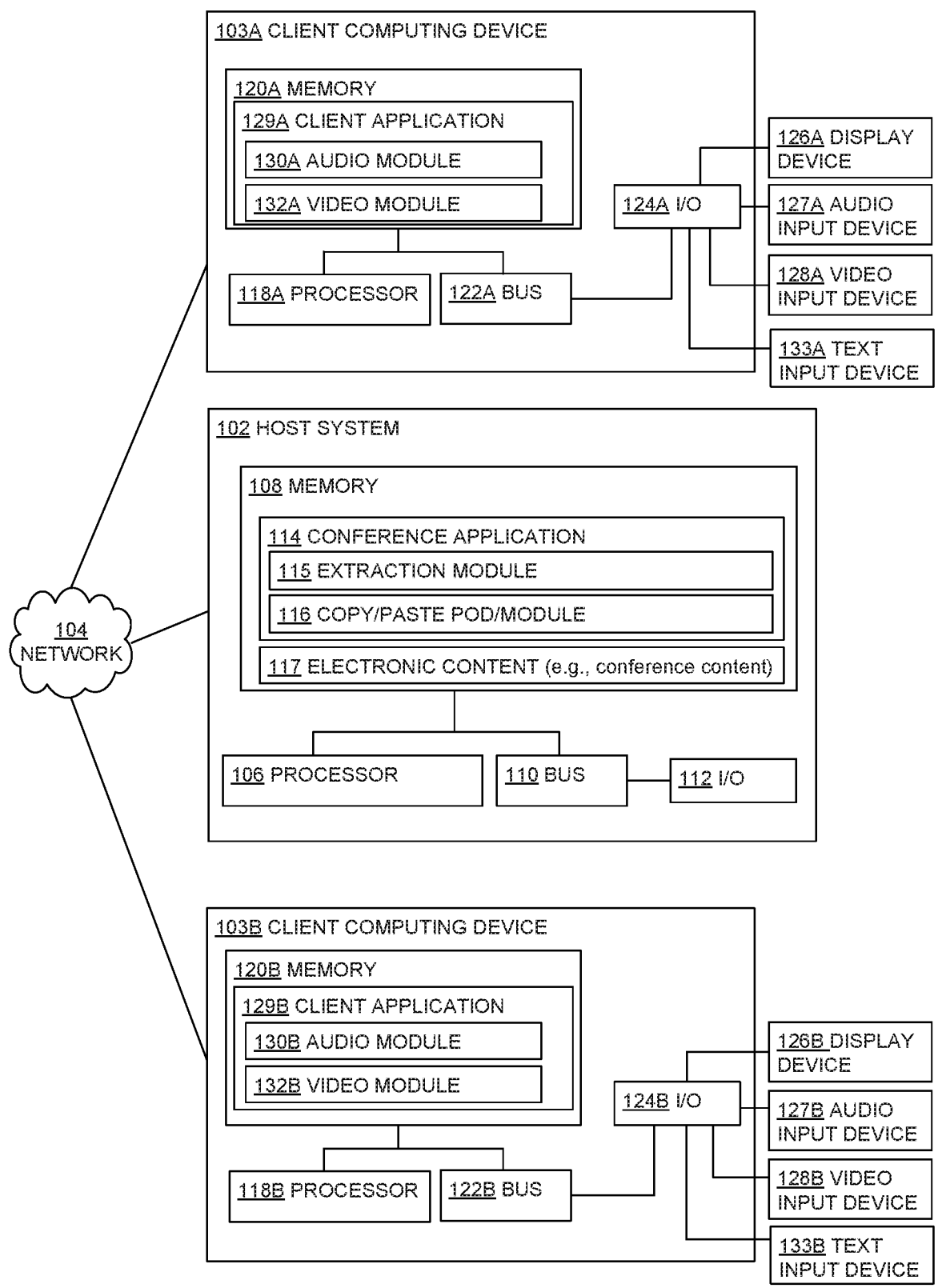
FIG. 1 is a block diagram depicting example computing systems for implementing certain embodiments.

Generally, the embodiments described herein are directed to, among other things, allowing users to interact with content shared in a web conferencing session. For example, a computing service, such as a web conferencing service, may be implemented to interact with electronic content presented in web meetings, eLearning sessions, and webinars.

In some embodiments, a conference host uses a web conferencing service to share web conference content with one or more conference attendees or participants. The conference content can be a video stream corresponding to the host's desktop, the host's browser session, or a file provided by the host such as, for example, a PowerPoint™ presentation, a word processing file, or a PDF file. The web conferencing service includes an extraction module configured to extract data items from the content. In the case of a file, the data extraction can occur in response to the file being uploaded by the host to the web conferencing service. For live streaming content, the data extraction can occur in parallel with presentation of the streaming content. In one embodiment, the extraction module can extract text items from the content and store the extracted text items in a database or data store accessible by the web conferencing service. If, during the presentation, a conference participant selects a portion of the content that they are interested in, such as, for example a Uniform Resource Locator (URL) or link present in the content, the web conferencing service can retrieve extracted data items corresponding to the selection so that the participant can interact with the extracted data items. In this example, the participant can subsequently use the selection (e.g., by clicking on an extracted URL or pasting the URL into an address bar of a browser). Such copy/paste operations are not possible if the conference content is a video stream and no data extraction is performed.

In certain embodiments, a conference application, such as, for example, Adobe® Connect™, can be used to show conference content such as a PowerPoint™ presentation, a web page, a PDF file, a word processing document, a shared desktop, or other content during a web conference. When the content includes a document, such as a PowerPoint™ presentation, a PDF, or a word processing document, the document can be uploaded to the conference application by a host of the conference. For instance, the host may upload the document before the conference begins. Other conference content, such as a shared desktop or a browser session of a conference host, can be streamed directly. Embodiments disclosed herein provide copy/paste support for both types of content, uploaded documents, and live streaming content.

In certain embodiments, a web conferencing application configured to share conference content such as streaming video, audio, and uploaded content can also enable users to perform copy/paste operations on content presented in a web conference. Computer-implemented systems and methods are disclosed for enabling selection and copying of web conference content corresponding to text or other content extracted from the conference content. In some embodiments, the conference content can include one or more files uploaded by a conference host prior to the conference. According to these embodiments, the uploaded files can include one or more word processing documents, presentation program documents, PDF files, or other files transmitted to a web conference application before a conference begins. In additional or alternative embodiments, the conference content includes content transmitted during the web conference. In these embodiments, the content can include a video stream of a conference host's desktop and/or a stream of the host's web browser session. A web conference application, such as, for example, Adobe® Connect™ or another suitable application, can be used to host a web conference.

A web conference can be an online session in which multiple clients at remote locations can share multimedia content and other electronic content in real time. The web conference can communicatively connect multiple clients for live sharing of documents, a desktop, a browser session, audio, and video. Text data can be received during the web conference. Examples of such text data are text items in documents being shared during a web conference, where the documents can include a PowerPoint™ presentation, a PDF file, or word processing documents. Audio data can also be received during the web conference. An example of such audio data is digital audio captured at different client devices when participants in the web conference speak to one another. A filter or other software module can be executed by the web conference application to filter the audio in real time. One or more keywords can be extracted from the filtered audio data. The keywords can be used to retrieve extracted text content or other multimedia content. Video and/or images transmitted during the web conference can be correlated to selected portions of conference content or other multimedia content as part of a copy/paste operation. A non-limiting example of a copy/paste operation involving video content can include extracting image objects from a video transmitted by a participant in the web conference where the extracted images can be correlated to portions of a conference video stream selected by a conference participant. The participant can be provided with a copy of the extracted images based on a selection (e.g., a copy operation) initiated by the participant. The web conference application retrieves extracted images corresponding to the selection and provides the images to the participant in the web conference.

In accordance with one embodiment, a web conference application or other application provides copy/paste functionality within a web conference by correlating text or other content extracted from audio data during the web conference with selections of portions of the web conference content. The conference application can receive audio content from at least one client participating in a web conference, such as (but not limited to) digital audio data representing words spoken by one of the participants of the web conference. The conference application can extract at least one text item from the audio content. For example, the conference application can apply a software filter to the audio content and execute a speech recognition algorithm to identify one or more words in the audio content. The conference application can enable a conference participant to perform copy and paste operations with the electronic content by correlating the participant's selections of portions of the electronic content received via the web conference with extracted data. In certain embodiments, the extracted data can include extracted text items and extracted images. The extracted text items can be extracted from audio content. For example, the words or another sound pattern identified by the software filter may be compared to stored multimedia content, such as (but not limited to) extracted text items previously extracted from conference content and stored in a database accessible by the conference application. The conference application may determine that one or more words extracted from the audio content match or otherwise correspond to keywords included in previously extracted text items. The conference application may combine video content received from a participant in the conference with the audio content while also allowing copy/paste operations for text items corresponding to text extracted from the audio content. The conference application can provide copy/paste functionality for electronic content via the web conference. In one non-limiting example, a conference application can receive a selection of a portion of electronic content provided to a recipient computing device. A conference host from which the electronic content originated can grant copy/paste permissions to conference participants. In another non-limiting example, a conference application can receive selections of portions of electronic content from multiple participants in the web conference, where the electronic content is uploaded by the conference host prior to the conference.

As used herein, the terms "conference application" and "web conference application" are used to refer to a service or other application that can host a session for sharing electronic content in real time via a data network among multiple clients at remote locations. Non-limiting examples of a web conference include webinars, online workshops, online meetings, and the like. In some embodiments, a conference application allows multicast communications from one host client to many receiver clients. In other embodiments, a conference application allows real-time point-to-point communications. A conference application can include one or more additional features such as (but not limited to) text-based chat features, voice and video chat features, sharing of desktops, etc.

As used herein, the term "electronic content" is used to refer to any type of media that can be rendered for display or use at a computing system or other electronic device. Electronic content can include text or multimedia files, such as images, video, audio, or any combination thereof. Conference content can include electronic content. For example, conference content can include one more files uploaded to a conference application. Also, for example, web conference content can include a video stream corresponding to a presenter's shared desktop or a presenter's browser session. In certain embodiments, a copy operation can be initiated when a conference participant selects a portion or subset of conference content, and extracted data corresponding to the selected portion can be provided to the participant for a subsequent paste operation.

As used herein, the term "clipboard" is used to refer to a location in a memory device accessible via multiple applications that provides short-term data storage and/or data transfer among documents or applications. Data transfer between documents and applications can be performed via interface commands for transferring data such as cutting, copying, and/or pasting operations. For example, a clipboard can provide a temporary data buffer that can be accessed from most or all applications within a runtime environment. In some embodiments, a clipboard can allow a single set of data items to be copied and pasted between documents or applications. Each cut or copy operation performed by a conference participant on a given subset or portion of conference content may overwrite a previous set of data stored in the participant's clipboard. In other embodiments, a clipboard can allow multiple sets of data items to be copied to the clipboard without overwriting one another. A clipboard may be implemented using local storage of a conference participant's browser.

As used herein, the term "client" is used to refer to a logical entity used in accessing a server and can refer to an account, device, or software application associated with one or more particular persons. As examples, a client may be an entity, such as an account used by an application to access an online service or other application. Similarly, as another example, a client may be a device executing an application to access the online service or other application. An account for a client can also include one or more authentication credentials, such as a password, personal identification number, a security question and an associated answer, etc. In some embodiments, a single client corresponding to a single client account can be associated with a single computing device. In other embodiments, multiple clients corresponding to multiple respective accounts can be associated with a single computing device. In other embodiments, a single client corresponding to a single client account can be associated with multiple computing devices.

As used herein, the term "metadata" is used to refer to information associated with (and generally but not necessarily stored with) an electronic content item that describes a feature of the electronic content item. The electronic content item can be a data item included in conference content. Metadata may describe a location or identification of electronic content. Non-limiting examples of metadata for an electronic content item can include a title, author, keywords, and the like. Metadata may also describe a relationship between a first electronic content item and a second electronic content item, such as how the first and second electronic content items can be combined and sequenced for a multimedia presentation. Metadata can also describe when and how an electronic content item was created, a file type and other technical information for the electronic content item, and/or access rights for the electronic content item. In some embodiments, metadata includes data included in the electronic content item that is not displayed by a client application using the electronic content item. In certain embodiments, meta data indicating the file type can be used by an extraction module to convert text in proprietary format documents to ASCII text. For example, the extraction module can use a conference document's meta data to determine that the document is a certain type of Microsoft® Office file, and then invoke a conversion tool to convert text within the Microsoft® Office file to ASCII text for text extraction purposes. One non-limiting example of a conversion tool is Apache POI Java libraries from the Apache Software Foundation. Such libraries can be invoked for reading and recognizing ASCII text in Microsoft® Word documents, PowerPoint™, presentations, and Excel™ spreadsheets. The extraction module can then store the ASCII text as text items in a database or data store accessible by the conference application. The database can include a field or column usable to correlate the text items to portions of the conference documents.

In some embodiments, the conference application can determine that keywords extracted from audio content match or otherwise correspond to extracted text data. An extraction module can perform text extraction on documents presented in a web conference and simultaneously extract keywords or phrases from audio content. The conference application can perform one or more operations to retrieve extracted data items that correspond to a selection of content displayed during the web conference. For example, the conference application can identify stored, extracted data items that correspond to a copy selection made by a conference participant during the conference. The conference participant can select a portion of conference content being displayed during the web conference, and the conference application can retrieve extracted data items corresponding to the selection.

The conference application can augment a web conference by allowing copy/paste operations for conference content. For example, the application provides copy/paste functionality by correlating text content extracted from documents or real-time audio content to a copy selection made during the conference. In some embodiments, the conference application can identify stored, extracted data items corresponding to a selection of content made during a conference. The correlation can be based on the text extracted from the real-time audio content. The conference application can augment the web conference by retrieving electronic content for sharing via the web conference and/or by modifying electronic content shared via the web conference. For example, the conference application can access a given file in response to a voice command or navigate within a multimedia presentation in response to a voice command.

In an embodiment, a web conference application can provide access to a presentation. An example of a web conference application is Adobe® Connect™ from Adobe Systems, Incorporated.

As used herein, a "computing service" refers to a service provided by a host system or computing device for providing various services to users. An example of a computing service is a web conferencing service, such as Adobe® Connect from Adobe Systems, Incorporated, configurable to facilitate the exchange of electronic documents between users and applications. The computing service may be implemented, in one embodiment, by software programs executed on one or more computing systems to carry out numerous workflow tasks. The computing service may also be implemented using computing hardware and/or firmware.

As used herein, an "electronic document" refers to a document that has an electronic format and that can be shared by users. In an example, an electronic document can be a multimedia presentation, a word processing document, a video file, or a PDF file, etc. Other examples of electronic documents include, without limitation, policy documents, minutes, notes, memoranda, cards, drawings, reports, lists, letters, etc. Electronic documents can be presented during a web conference as part of web conference content. In general, the invention is not limited to any particular type of web conference content and is applicable to any type of electronic content that may be presented or shared in a web conference.

As used herein, a "workflow" refers to a series of actions that should or may be required to be performed in association with providing copy/paste support for an electronic document or other conference content in a web conference.

As used herein, the terms "web conference," "electronic conference," and "electronic meeting" refer to a group of users coming together at either coordinated times or at a synchronized time, whereupon their presence is recorded and the users are attendees or participants in the meeting to some extent. Users present at an electronic meeting can include a meeting host and one or more participants or attendees. A web conference can comprise one or more web conference sessions where the participants' presence is either recognized or identified. That is, a web conference is something in which a user such as a host or an attendee can be present or not present in, and can be participating or not participating in.

Unless specifically stated differently, a "user" is interchangeably used herein to identify a user account of a conference attendee or participant, a human user, or a software agent. Besides a human user who accesses, hosts, and presents web conference content such as electronic documents, a software application or agent sometimes accesses and presents electronic documents. The systems and methods disclosed herein can provide copy/paste support for electronic documents presented in a web conference to conference attendees, where attendees can include both human users and software agents. Accordingly, unless specifically stated, the term "user" as used herein does not necessarily pertain to a human being.

As explained herein above, a computing service, such as a web conferencing service may be implemented to provide various services to users. The web conferencing service may allow a first user (e.g., a host or presenter) to specify content to be shared during a conference, to identify other users that should have access to the content (e.g., conference attendees or participants), and to indicate whether other users should be allowed to copy and paste portions of the conference content.

Example Computing Environment

Referring now to the drawings, FIG. 1 is a block diagram depicting example computing systems for implementing certain embodiments. The example computing systems include a host system 102 and client computing devices 103a, 103b in communication via a network 104. The network 104 may be any type of communication network that may include, for example, any one or a combination of many different types of networks, such as cable networks, the Internet, wireless networks, cellular networks, and other private and/or public networks.

The host system 102 includes a processor 106. The processor 106 may include a microprocessor, an application-specific integrated circuit ("ASIC"), a state machine, or other suitable processing device. The processor 106 can include any number of computer processing devices, including one. The processor 106 can be communicatively coupled to a computer-readable medium, such as a memory 108. The processor 106 can execute computer-executable program instructions and/or accesses information stored in the memory 108. The memory 108 can store instructions that, when executed by the processor 106, cause the processor to perform operations described herein.

A computer-readable medium may include (but is not limited to) an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

The host system 102 may also include a number of external or internal devices, such as input or output devices. For example, the host system 102 is shown with an input/output ("I/O") interface 112. A bus 110 can also be included in the host system 102. The bus 110 can communicatively couple one or more components of the host system 102.

Each of the client computing devices 103a, 103b includes respective processors 118a, 118b. Each of the processors 118a, 118b may include a microprocessor, an ASIC, a state machine, or other processor. Each of the processors 118a, 118b can include any of a number of computer processing devices, including one. Such a processor can include or may be in communication with a computer-readable medium. As depicted in FIG. 1, each of the processors 118a, 118b is communicatively coupled to respective memories 120a, 120b. Each of the processors 118a, 118b respectively executes computer-executable program instructions and/or accesses information stored in the memories 120a, 120b. The memories 120a, 120b store instructions that, when executed by the processor, cause the processor to perform one or more operations described herein.

The client computing devices 103a, 103b may also comprise a number of external or internal devices such as a mouse, a CD-ROM, DVD, a keyboard, a display, audio speakers, one or more microphones, a camera or any other input or output devices. For example, each of the client computing devices 103a, 103b is respectively shown with I/O interfaces 124a, 124b, display devices 126a, 126b, audio input devices 127a, 127b, video input devices 128a, 128b, and text input devices 133a, 133b. A non-limiting example of a display device is a computer monitor or computer screen. A non-limiting example of an audio input device is a microphone. A non-limiting example of a video input device is a camera. Non-limiting examples of text input devices include a keyboard and a touch screen. Although FIG. 1 depicts the display devices 126a, 126b, audio input devices 127a, 127b, video input devices 128a, 128b, and text input devices 133a, 133b as separate devices coupled to the client computing devices 103a, 103b, some or all of the display devices 126a, 126b, audio input devices 127a, 127b, video input devices 128a, 128b, and text input devices 133a, 133b can be respectively integrated into the client computing devices 103a, 103b.

Buses 122*a*, 122*b* can be respectively included in the client computing devices 103*a*, 103*b*. Each of the buses 122*a*, 122*b* can communicatively couple one or more components of the client computing devices 103*a*, 103*b*.

FIG. 1 also illustrates the conference application 114 comprised in the memory 108 of the host system 102 and the client applications 129*a*, 129*b* respectively comprised in the memories 120*a*, 120*b* of the client computing devices 103*a*, 103*b*. The conference application 114 stored in the memory 108 can configure the processor 106 to manage and provide a web conference session between the client application 129*a* executed at the client computing device 103*a* and the client application 129*b* executed at the client computing device 103*b*. A non-limiting example of a conference application 114 is Adobe® Connect™. Non-limiting examples of client applications 129*a*, 129*b* include browser applications and conference client applications.

The client applications 129*a*, 129*b* can access the conference application 114 to establish a web conference or other communication session. A communication session for communicating via the conference application 114 can be established by the client applications 129*a*, 129*b* via the network 104 between client computing devices 103*a*, 103*b* and the host system 102. Each of the client applications 129*a*, 129*b* can include one or more software modules, such as the audio modules 130*a*, 130*b* and the video modules 132*a*, 132*b*. The audio modules 130*a*, 130*b* can respectively configure the processors 118*a*, 118*b* to communicate audio data to the conference application 114 and to process audio data received via the conference application 114 for playback at the client computing devices 103*a*, 103*b*. Audio data can be generated based on sounds captured by the audio input devices 127*a*, 127*b*. Audio data can also be generated by applications executed at the computing devices 103*a*, 103*b*. The video modules 132*a*, 132*b* can respectively configure the processors 118*a*, 118*b* to communicate video data to the conference application 114 and to process video data received via the conference application 114 for playback at the client computing devices 103*a*, 103*b* via the display devices 126*a*, 126*b*. Video data can be generated based on images captured by the video input devices 128*a*, 128*b*. Video data can also be generated by applications executed at the computing devices 103*a*, 103*b*, such as the sharing of desktops via the conference application 114.

In some embodiments, the client applications 129*a*, 129*b* can be stand-alone applications. In other embodiments, the client applications 129*a*, 129*b* can be embedded in another application, such as an internet browser application. A non-limiting example of a client application is Adobe® Connect™ client software.

The host system 102 can include any suitable computing system for hosting the conference application 114. In one embodiment, the host system 102 may be a single computing system, such as a server system. In another embodiment, the host system 102 may be a virtual server implemented using a number of computing systems connected in a grid or cloud computing topology. For example, the host system 102 may include a number of computing devices clustered as a computing system configured to host one or more network-based resources such as the conference application 114. A datacenter and a server farm are examples of such computing system. Computing devices 103*a* and 103*b*, and host system 102 may be connected by a network 104. The network 104 can be any type of communication network that may include, for example, any one or a combination of many different types of networks, such as cable networks, the Internet, wireless networks, cellular networks, and other private and/or public networks.

The client computing devices 103*a*, 103*b* can include any suitable computing device or system for communicating via a network 104 and executing the client applications 129*a*, 129*b*. Non-limiting examples of a suitable computing device or system include a desktop computer, a tablet computer, a smart phone, or any other computing device or system suitable for using electronic content.

The host system 102 can provide access to electronic content 117. The electronic content 117 may be resident in any suitable computer-readable medium and execute on any suitable processor. In one embodiment, the electronic content 117 can reside in the memory 108 at the host system 102. In another embodiment, the electronic content 117 can be accessed by the host system 102 from a remote resource, such as another computing system, via the network 104 and provided to the client computing devices 103*a*, 103*b*. As shown in FIG. 1, the electronic content 117 be conference content. Such electronic content 117 can include, for example audio, video, and textual content provided by conference application 114 to the client computing devices 103*a*, 103*b* as part of a web conference. In some embodiments, the electronic content 117 can be one or more files uploaded via the network 104 to the host system 102 before the conference begins. The uploaded files can include, but are not limited to, word processing files such as Microsoft® Word documents, presentation program files such as Microsoft® PowerPoint™ presentations, and/or PDF files. The uploads can be initiated by a participant in the conference, such as, for example a conference host or organizer.

The conference application 114 can include modules for analyzing, converting, modifying, storing, extracting, providing, or otherwise using the electronic content 117 in a web conference between the client applications 129*a*, 129*b*. The conference application 114 can include an extraction module 115 and a copy/paste pod 116. Although the extraction module 115 and the copy/paste pod 116 are depicted in FIG. 1 and described herein as separate logical modules or components of a conference application 114 for ease of reference, other implementations are possible. In some embodiments, the conference application 114, extraction module 115, and/or the copy/paste pod 116 can be separate applications that can be separately executed by the processor 106. In other embodiments, the conference application 114, extraction module 115, and/or the copy/paste pod 116 can be a combined logical module executed by the processor 106. The extraction module 115 can include software, such as (but not limited to) an audio filter, for extracting keywords or other textual content from audio content provided by the audio modules 130*a*, 130*b* and/or video content provided by the video modules 132*a*, 132*b*. The copy/paste pod 116 can include software for selecting at least some of the electronic content 117. A user can view the conference content at a client computing device 103*a* used to connect the conference.

The extraction module 115 can perform data extraction in parallel with receiving electronic content 117. For example, as electronic content 117 is received by the conference application 114, the extraction module 115 can analyze the electronic content 117 to determine a content type (e.g., a word processing document, a PowerPoint™ file, a PDF file, or a video file), parse the electronic content 117, and extract data items from the content. In certain embodiments, the analysis performed by the extraction module 115 includes analyzing the electronic content 117 to identify data types of data items in the electronic content 117. For instance, the extraction module 115 can perform analysis to determine that the electronic content 117 includes one or more of text data items, image data items, video data items, and audio data items. The extracted data items can be stored in the memory 108 of the host system 102. Alternatively, the extracted data items can be stored at a remote network storage device accessible via network 104. In one embodiment, the extraction module 115 extracts ASCII text from the electronic content 117. The extracted text can correspond to words, phrases, passages, or other text strings present in the electronic content 117. For example, the extraction module 115 can extract text corresponding to a URL or hyperlink present in the electronic content 117 that identifies a web page. In additional or alternative embodiments, the extraction module 115 can recognize and extract other types of data items from the electronic content 117. For instance, when the electronic content 117 includes video content, the extraction module 115 can extract images from the video content.

The extraction module 115 can work in conjunction with the copy/paste pod 116 to provide copy/paste functionality for users of the conference application 114. For example, when a user at a client computing device 103a selects a portion of the electronic content 117 during a web conference, the copy/paste pod 116 can retrieve extracted data items corresponding to the selection, and provide the retrieved data items to a client application 129a via a web session. The copy/paste pod 116 can present the selected portion of the electronic content 117 within a window of a graphical user interface (GUI) of the conference application 114. For instance, the conference application 114 GUI and the copy/paste window can be rendered by display device 126a.

In additional or alternative embodiments, the conference application 114 can include other components besides the extraction module 115 and the copy/paste pod 116. The other components (not shown) may include, but are not limited to, a chat pod, a conversation pod, and a webcam pod. According to these embodiments, a chat pod can be presented by the conference application 114 in a web conference between the client applications 129a, 129b so that users of client computing devices 103a, 103b can exchange chat communications input via their respective text input devices 133a, 133b. The chat pod and chat communications can be presented within a chat window of an interface of the conference application 114. A conversation pod can be used by users of client computing devices 103a, 103b to carry on a conversation using their respective audio input devices 127a, 127b. Similarly, a webcam pod can be used by the conference application 114 to present video content from video input devices 128a, 128b (e.g., respective webcams of client computing devices 103a, 103b). Windows for the pods can be displayed on the display devices 126a, 126b of client computing devices 103a, 103b used to access the conference application 114.

Example workflows and processes for extracting, storing, selecting, and providing conference content are described in detail below with respect to FIGS. 2-4.

Example Workflows

Figure 2:
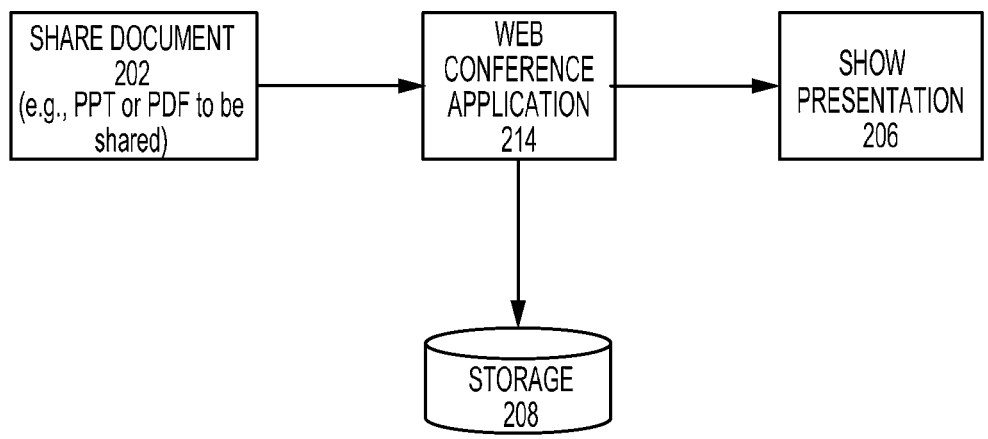
FIG. 2 is a block diagram illustrating an example workflow for presenting web conference content, in accordance with embodiments.

FIG. 2 illustrates an example workflow for presenting web conference content. In the example of FIG. 2, workflow 200 begins when conference application 214 receives a share document 202. As shown, share document 202 can be a PowerPoint™ presentation or PDF file to be shared during a web conference. The conference application 214 may be used to host an online seminar, webinar, eLearning session or other type of web conference. The conference application 214 can analyze the content of the share document 202 provided by a participant and store extracted data items from the share document 202 in storage 208. The conference application 214 can provide a video stream of the share document 202 in order to show a presentation 206 during the conference.

Figure 3:
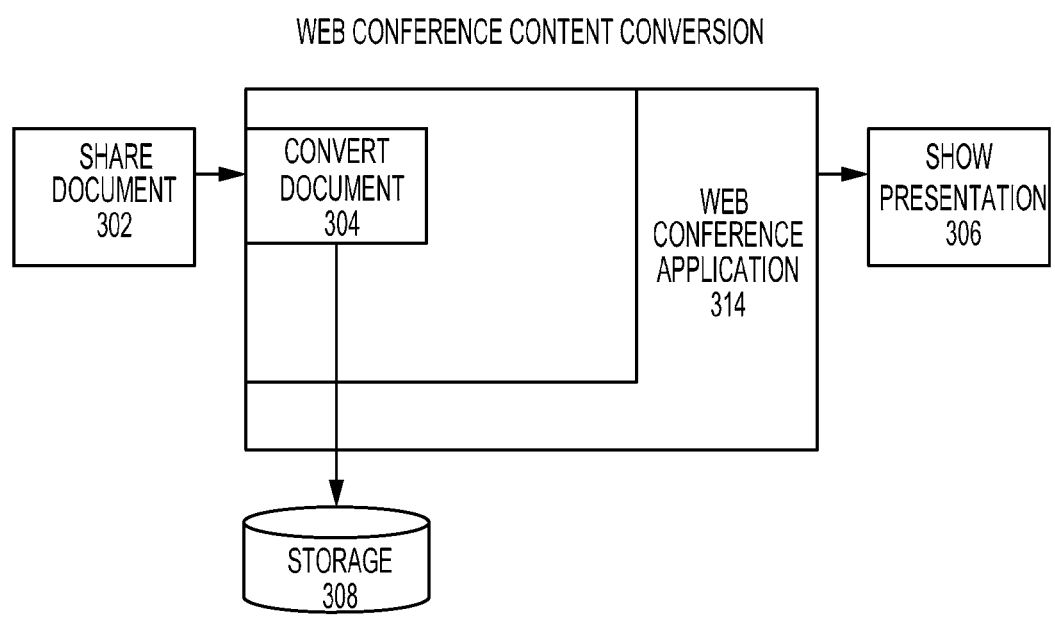
FIG. 3 is a block diagram illustrating an example workflow for converting web conference content, in accordance with embodiments.

FIG. 3 depicts a block diagram illustrating an example workflow 300 for converting web conference content. In workflow 300, a share document 302 is received at a conference application 314. The workflow 300 includes a document conversion 304 that is performed by conference application 314. The document conversion 304 for transforms the share document 302 into a web stream (e.g., a video stream). For example, after a conference host uploads the share document 302, document conversion 304 is performed and the converted document is stored as a video stream in storage 308. Then, the presentation 306 is provided to conference participants, who will view the video stream.

Figure 4:
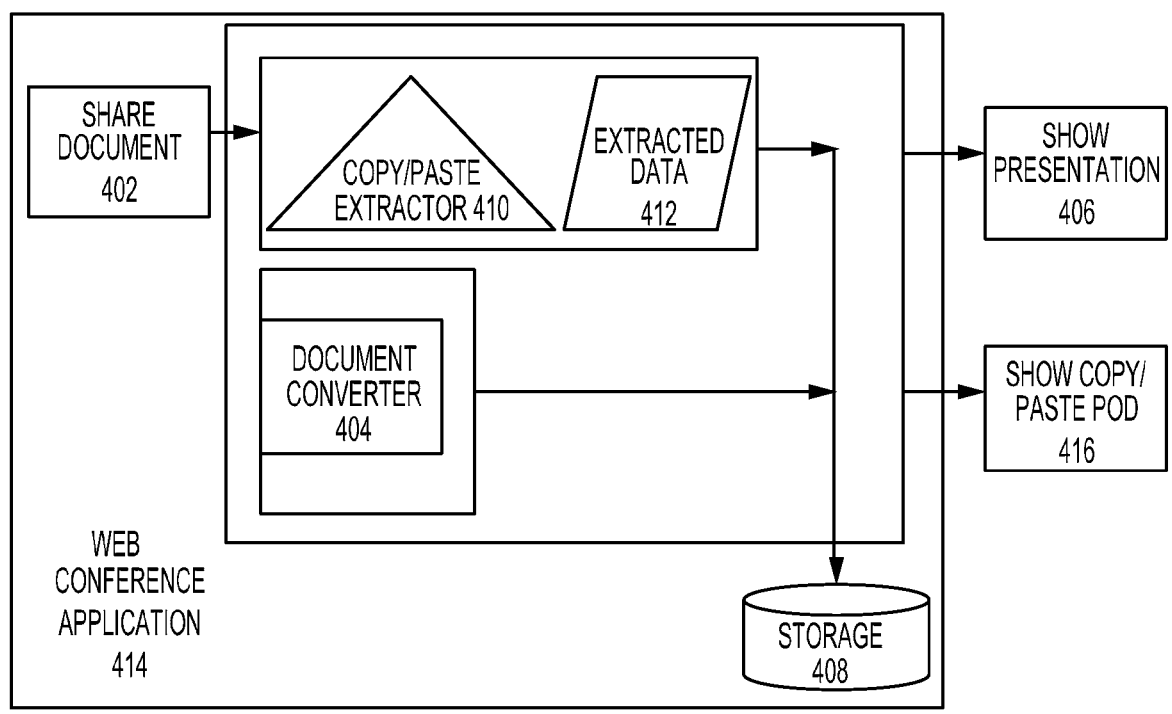
FIG. 4 is a block diagram illustrating an example workflow for converting web conference content and extracting data from the content, in accordance with embodiments.

FIG. 4 illustrates an example workflow 400 for converting web conference content and extracting data from the content. As shown, a web conference application 414 may include various components and modules such as a document converter 404, storage 408, and a copy/paste extractor 410, each of which is described in the following paragraph. These components and modules may be interconnected such that the share document 402 may be analyzed by the copy/paste extractor 410 to produce extracted data 412 and the share document 402 can also be simultaneously converted by document converter 404 to a video stream used for presentation 406. For example, the copy/paste extractor 410 can be embodied as an extraction routine that is configured to receive the share document 402 as input, analyze the document's contents, extract data items (e.g., text data) as extracted data 412, store the extracted data 412 in storage 408, and display the extracted data 412 in copy/paste pod 416.

In some embodiments, the analysis performed by copy/paste extractor 410 includes analyzing the share document 402 to identify data types of data items in the share document 402. For example, the copy/paste extractor 410 can be configured to analyze meta-data in the share document 402 to determine data types of data items included in the share document 402, where the data types can be one or more of text, image, video, and audio.

In workflow 400, when a conference host uploads a share document 402 to a web conference application 414, document converter 404 is invoked in order to transform the share document 402 to a video stream, which is stored in storage 408. As illustrated in FIG. 4, workflow 400 also invokes a copy/paste extractor 410 to do data extraction in parallel with the document conversion. The extracted data 412 that is extracted from the share document 402 by the copy/paste extractor 410 can also be stored in storage 408. In one example, the copy/paste extractor 410 can be a background process that extracts text such that the extracted data 412 includes text extracted from the share document 402.

Other types of data can be extracted by copy/paste extractor 410. For example, image objects can be extracted from a share document 402 that includes image data such as graphical images, photographs, and video content. Also for example, as described above with respect to FIG. 1, the audio module 130a can generate audio data from sounds captured at the client computing device 103a via the audio input device 127a and provide the audio data to the extraction module 115. The extraction module 115 can be embodied as the copy/paste extractor 410. When web conference content includes audio content, the copy/paste extractor 410 can execute one or more filtering and/or speech recognition operations to extract audio data items from the audio data, which are then included in the extracted data 412. In one example, the audio data items can include audio clips corresponding to keywords or phrases. The speech recognition operations can be performed by a speech recognition module configured to implement a speech recognition algorithm.

The web conference application 414 may host an interface that can be presented to a conference participant to allow the participant to present, select, and paste conference content. The web conference application 414 may show a presentation 406 as a video stream corresponding to share document 402, where share document 402 was previously uploaded by a host to the web conference application 414, converted by document converter 404, and stored in storage 408. In the example of FIG. 4, the interface of the web conference application 414 also presents a copy/paste pod 416. The copy/paste pod 416 can present selected conference content in a sub-window or panel of the interface of the web conference application 414. For instance, the copy/paste pod 416 can display a portion of the conference content that a conference participant has selected for a copy/paste operation. When the selection includes text, the copy/paste pod 416 will display the selected text, and the conference participant that selected the text can subsequently paste the selected text in another application, such as for example, their web browser or a word processing application.

Example User Interface

Figure 5:
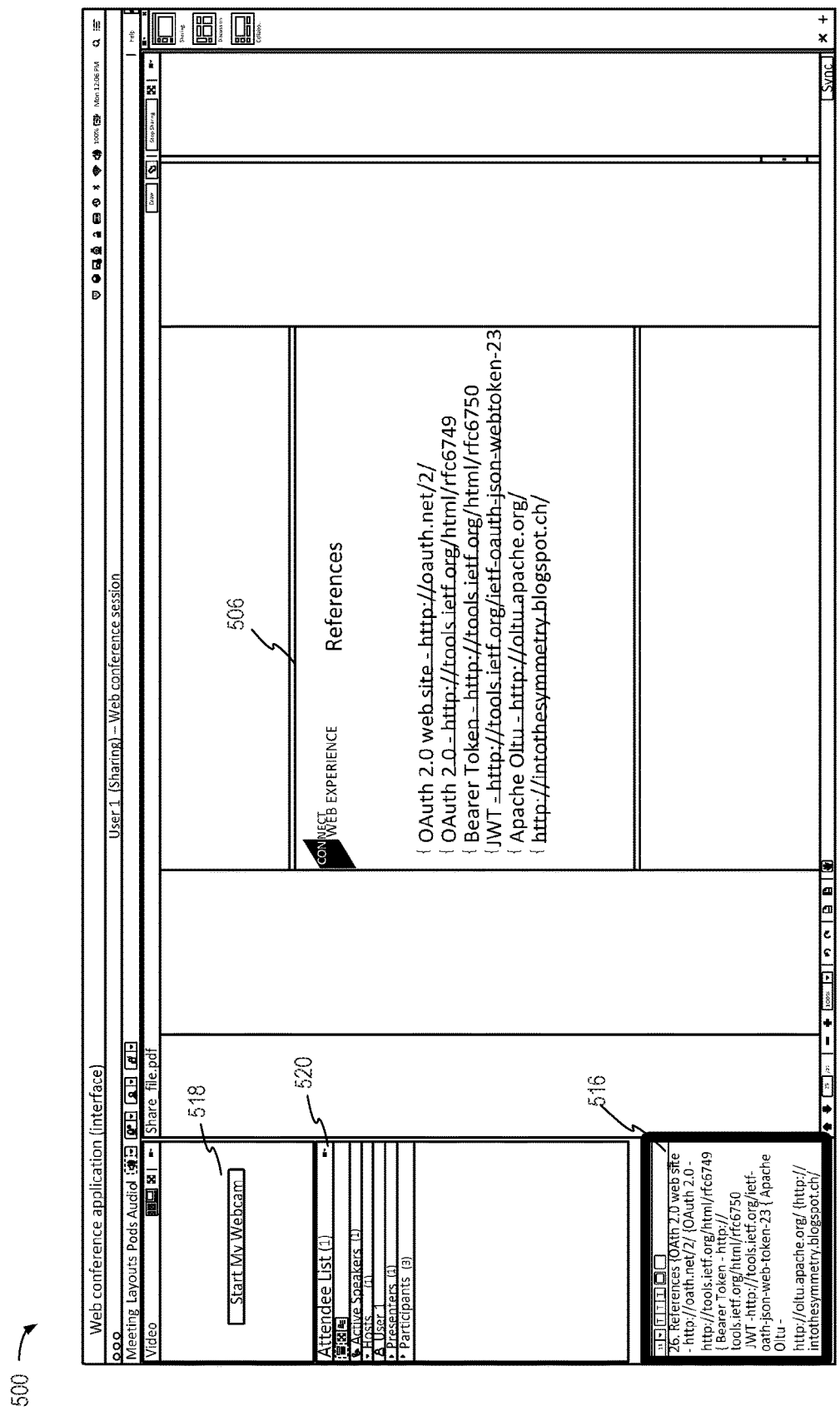
FIG. 5 illustrates a screenshot of an example web conference user interface for which various embodiments may be performed.

FIG. 5 is a screenshot of an example web conference user interface 500. The user interface 500 depicted in FIG. 5 is described with reference to the embodiments of FIGS. 1 and 4. However, the user interface is not limited to those example embodiments. In FIG. 5, the user interface 500 is shown with various icons, command regions, windows, toolbars, menus, and buttons that are used to initiate action, invoke routines, view conference content, select portions of conference content for pasting, and invoke other functionality. The initiated actions include, but are not limited to, selecting text from conference content, exchanging communications with conference attendees, and other conference-related inputs.

In embodiments, the display devices 126*a,* 126*b* of client computing devices 103*a,* 103*b* can be used to display the user interface 500 shown in FIG. 5. In additional or alternative embodiments, the user interface 500 may be displayed via the display interface 902 and the display device 930 described below with reference to FIG. 9. In certain embodiments, the user interface 500 can be configured to be displayed on a touch screen display device.

As shown in FIG. 5, the user interface 500 includes a presentation window 506 where conference content is shown. The conference content can correspond to a share document 402 or a live video stream, such as, for example a video stream of a shared desktop The user interface 500 also includes a copy/paste pod 516, a webcam pod 518, and a chat pod 520.

The copy/paste pod 516 displays extracted data items that correspond to a selection of conference content that has been made in the presentation window 506. In the example of FIG. 5, the copy/paste pod 516 displays text data corresponding to links selected in the presentation window 506, where the selection has been made by conference participant 'User 1.' In this example, User 1 has selected text for URLs in the presentation window 506 that is displaying a video stream showing the 'References' links. According to this example, the copy/paste pod 516 presents extracted text data corresponding to the selected links so that User 1 can subsequently paste the link text. In one embodiment, the extracted data items shown by the copy/paste pod 516 include extracted text data that has been extracted from live conference content shown in presentation window 506. Once displayed by the copy/paste pod 516, the extracted text data can be subsequently pasted by User 1 (e.g., as a paste into a browser address bar or into a word processing file).

The example webcam pod 518 includes a button (e.g., 'Start My Webcam') that if selected by a conference participant, enables the participant to share video captured by their webcam with other conference attendees. The chat pod 520 includes a list of conference attendees that can be selected by a participant so that the participant can initiate a chat session with the selected attendee.

Example Methods

Figure 6:
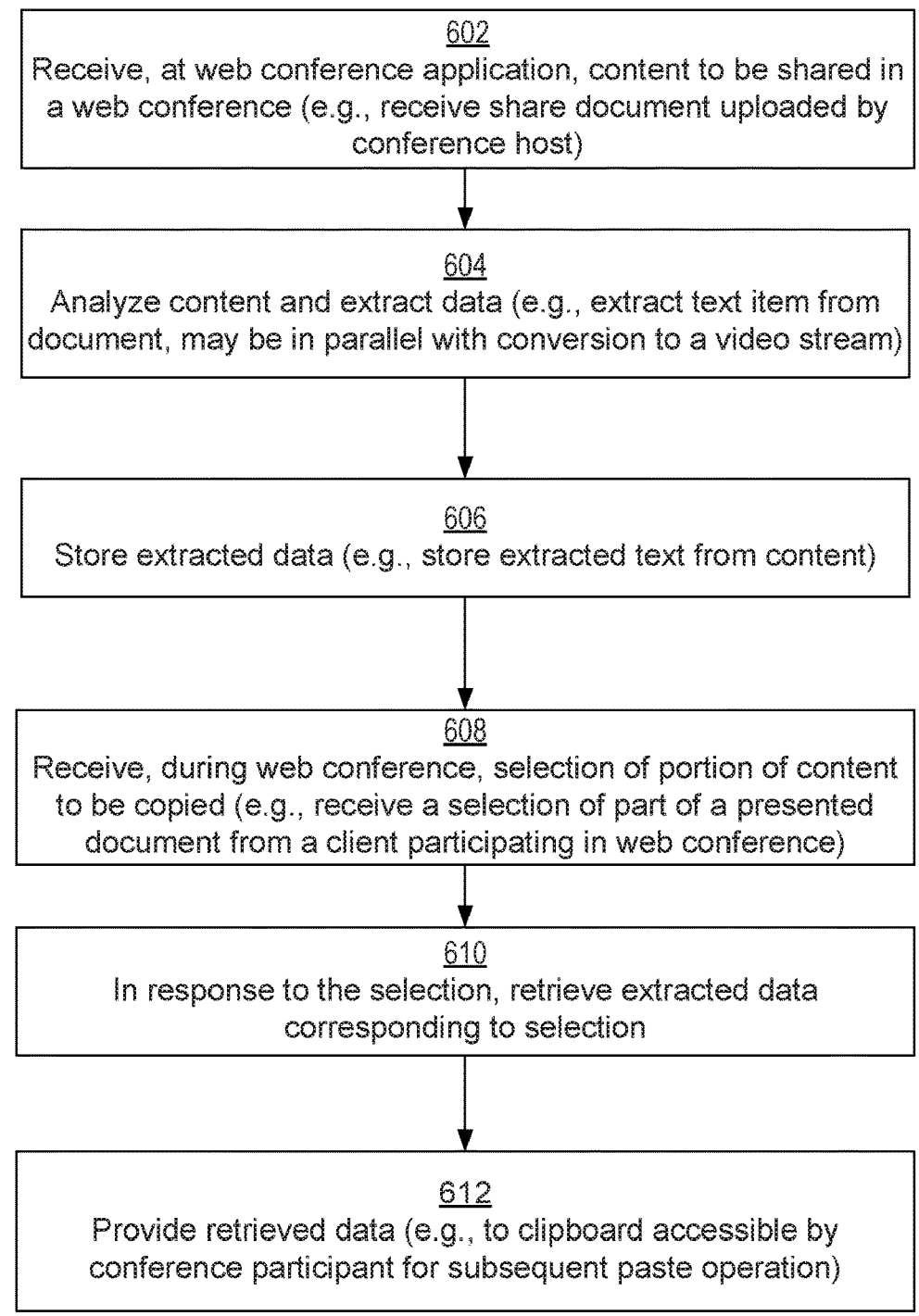
FIG. 6 is a flowchart illustrating an example method for providing copy/paste support for uploaded web conference content, in accordance with embodiments.
Figure 7:
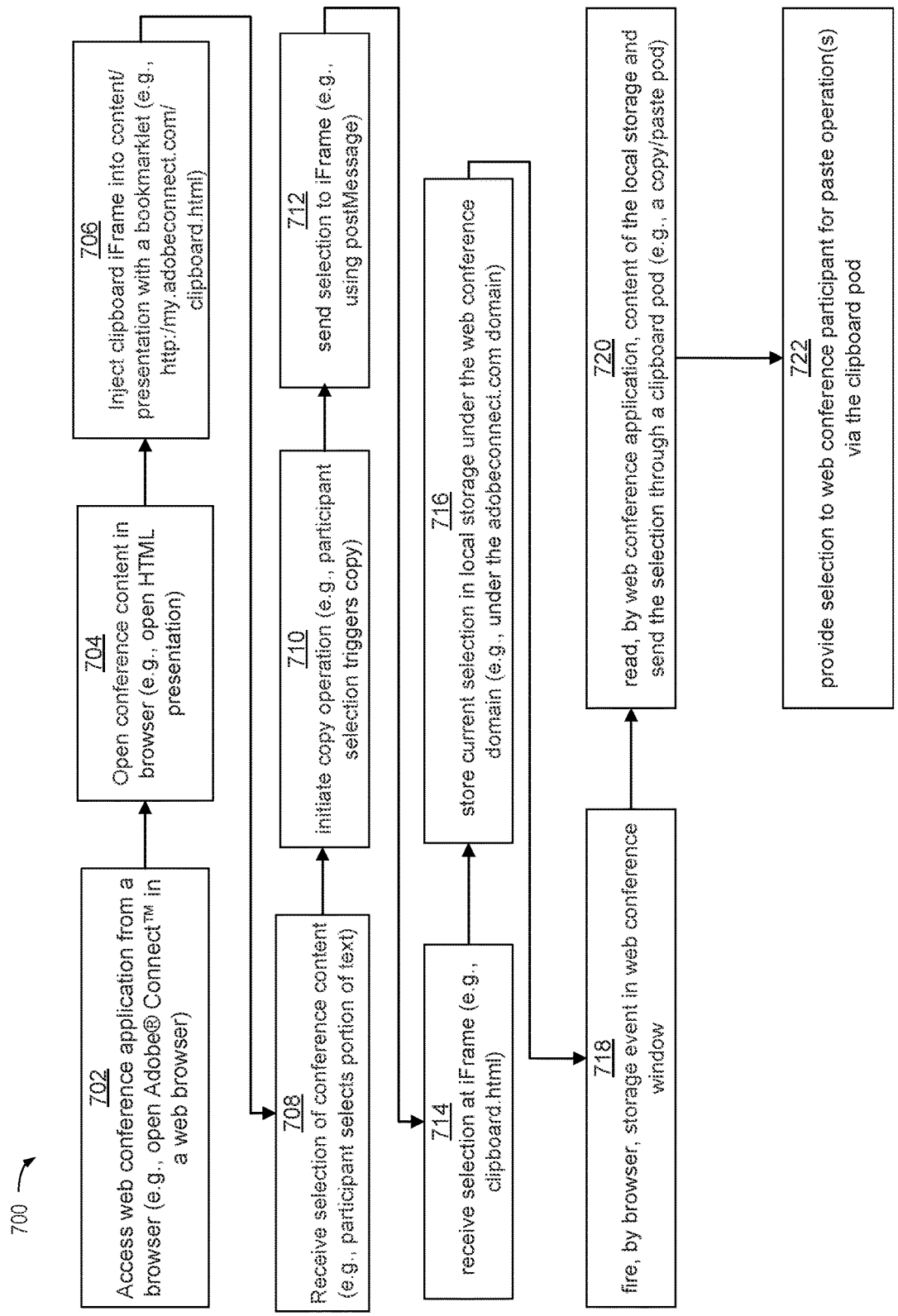
FIGS. 7 and 8 are flowcharts illustrating exemplary methods for providing browser-based copy/paste support for web conference content, in accordance with embodiments.
Figure 8:
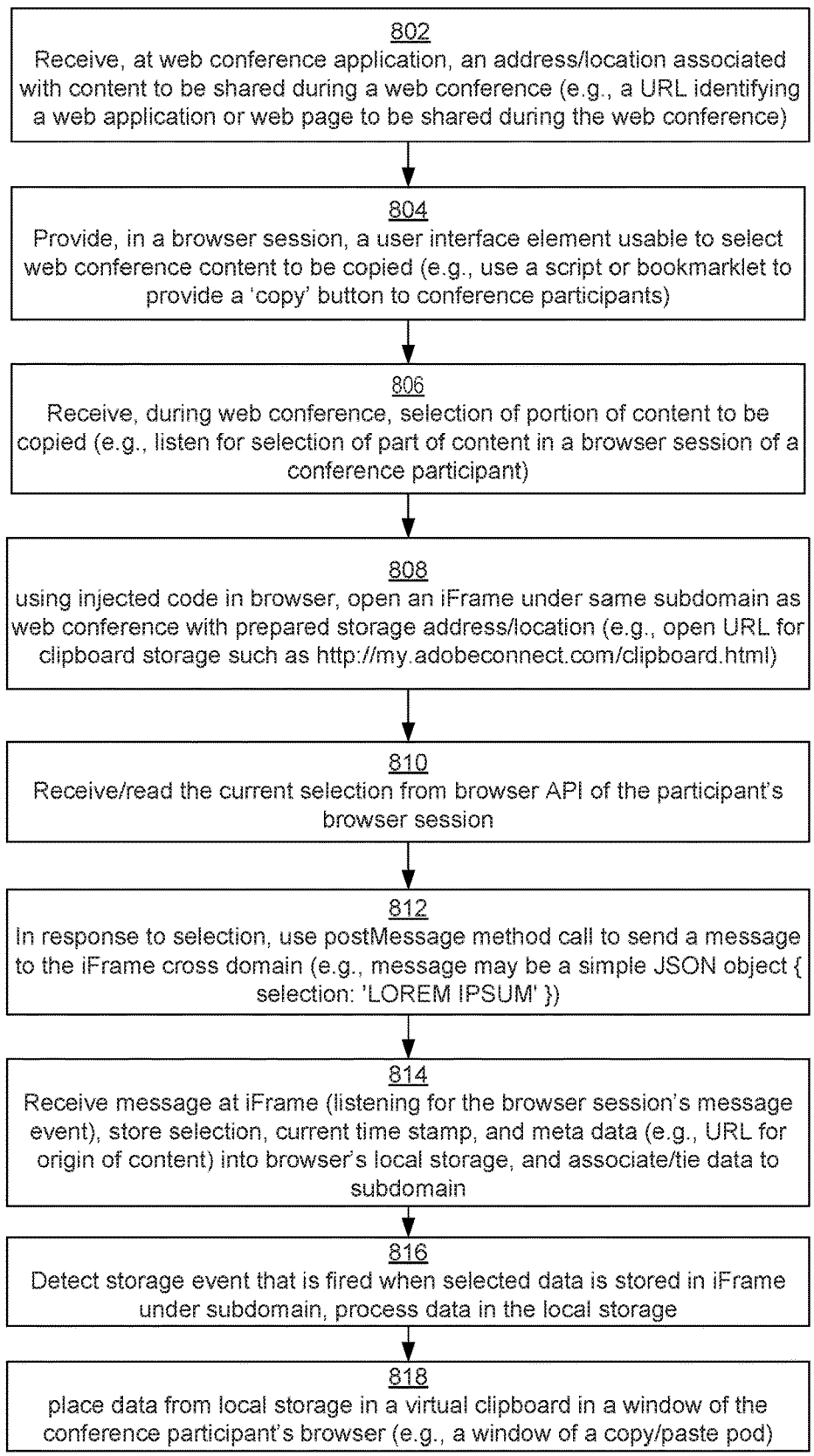

FIGS. 6-8 are flowcharts illustrating example methods for providing copy/paste support for web conference content. Such example methods may be performed on a variety of computer devices including, but not limited to, the computing devices 103*a* and 103*b,* and the host system 102 of FIG. 1, and the computing system 900 of FIG. 9. For purposes of illustration and not limitation, the features of the example methods shown in FIGS. 6-8 are described with reference to elements of FIGS. 1-5.

In embodiments, each of the illustrative operations or steps shown in FIGS. 6-8 may be embodied in, and fully or partially automated by, modules executed by one or more processors of a computing system hosting a web conferencing service (e.g., a server or host system 102 hosting a web conference application 114). The modules may include, for example, an extraction module 115, a copy/paste extractor 410, a copy/paste pod 116, and other modules that a web conference application may implement. Also, while the operations are illustrated in a particular order, it should be understood that no particular order is necessary and that one or more operations may be omitted, skipped, and/or reordered. Further, in the interest of clarity of explanation, a web conferencing service and a conferencing platform are described as performing the illustrative operations. Nevertheless, other or additional modules of a computing system may be configured to implement one or more of the operations and/or one or more steps of the operations.

FIG. 6 illustrates an example method that the web conference application may implement to provide a copy paste functionality for conference content. In particular, FIG. 6 illustrates an example method 600 for providing copy/paste support for an uploaded share document. FIGS. 7 and 8 are flowcharts illustrating example methods for providing browser-based copy/paste support for web conference content. Operations of the method 700 of FIG. 7 may be further embodied in operations of the example method 800 of FIG. 8. As such, some operations of the example methods of FIGS. 7 and 8 may be similar. Such similarities are not repeated herein in the interest of clarity of explanation. While the operations in the example methods are performed, the web conference application may store information and data extracted from web conference content.

In the interest of clarity of explanation, an example use case is described in the methods of FIGS. 6-8 where a host or presenter presents conference content in a web conference, and web conference has one or more attendees. However, the example methods are not limited to this use case. Instead, the web conference application may implement the example methods for other and different numbers of hosts and attendees.

With reference to FIG. 6, the example method 600 starts at operation 602, where the web conference application may receive conference content. As shown in FIG. 6, operation 602 can comprise receiving a share document uploaded by conference host. For example, operation 602 may be performed when a conference host operates a computing device to upload a document to a conference application 114 prior to a web conference. The host may operate the computing device to connect to the web conference application 114, which may then facilitate the upload by way of one or more interfaces. The host may use an interface, such as, for example, user interface 500 shown in FIG. 5, to upload an already created document to be presented during a web conference. For example, the host may use the interface to log-in to a host account, to upload web conference content in a certain format (e.g., a PowerPoint™ presentation or a PDF file), to identify attendees, to specify an organization or locations where the conference may be relevant, and to identify aspects of the content (e.g., whether the web conference application may automatically allow copy/paste operations to be performed on the content).

At operation 604, the web conference application 114 may analyze the received conference content and extract data items from the content. The analysis performed in operation 604 can include analyzing a conference document's meta data to determine that the document is a certain type of Microsoft® Office file, and then invoking a conversion tool to convert text within the Microsoft® Office file to ASCII text for text extraction purposes. One non-limiting example of a conversion tool includes Apache POI Java libraries. Such libraries can be invoked for reading and recognizing ASCII text in Microsoft® Word documents, PowerPoint™, presentations, and Excel™ spreadsheets. In some embodiments, operation 604 includes analyzing the conference document to identify data types of data items in the conference document. Non-limiting examples of data types include text, image, video, and audio.

As shown in FIG. 6, operation 604 may comprise extracting text item from an uploaded document, and this extraction may be performed in parallel with converting the document to a video stream. For example, the data extraction in operation 604 can be performed by copy/paste extractor 410 while document converter 404 is simultaneously converting the document to a video stream. In some embodiments, operations 602 and 604 can be performed in parallel. For example, as part of uploading a document in operation 602, the host may select a button at a host user interface indicating that the host wishes to 'share a document.' In this case, while uploading the document, an extractor routine (e.g., copy/paste extractor 410) can be run in order to extract data items (e.g., text items such as words and sentences) that are to be displayed in a copy/paste pod 416. In this example, when a document is shared, a conversion routine (e.g., document converter 404) is also invoked as part of operation 604.

At operation 606, the extracted data items are stored. As shown, operation 606 can comprise storing extracted text from the conference content. In certain embodiments, operation 606 can be performed by web conference application 414 so that extracted data 412 that has been extracted by copy/paste extractor 410 is stored in storage 408.

Next, at operation 608, during a web conference, a selection of a portion of the conference content is received. The selection can be received as a result of an input by a conference attendee or participant that selects a portion of content to be copied. In some embodiments, the input can be a touch screen gesture (e.g., an input received via display device 126a), a keyboard shortcut (e.g., an input received via text input device 133a), a voice command (e.g., an input received via an audio input device 127a), or a selection of a button in a user interface. As seen in FIG. 6, operation 608 can comprise receiving a selection of part of a presented document from a client participating in a web conference.

Then, at operation 610, in response to the selection, extracted data items corresponding to selection is retrieved. In an embodiment, operation 610 can be performed by retrieving extracted data 412 from storage 408, where the extracted data 412 is correlated to the selected portion of the web conference content (e.g., the selection received in operation 608).

At operation 612, after the extracted data is retrieved, it is provided. In the example of FIG. 6, the extracted data is provided to a clipboard accessible by the conference participant for a subsequent paste operation. In one embodiment, operation 612 can be performed using copy/paste pod 116, which presents the extracted data items in a user interface displayed at a display device 126a associated with the conference participant. When the extracted data items include text or image data, operation 612 can comprise presenting the extracted data items in a window of a user interface (see, e.g., copy/paste pod 516 of FIG. 5).

Turning to FIG. 7, that figure illustrates an example method for providing browser-based copy/paste support for web conference content. For example, in cases where the web conference content is not uploaded by a host or presenter prior to the conference, the method 700 shown in FIG. 7 can be used. In such cases, a web conference application presents content from a presenter's browser session. The content shown in the browser can include web pages from a local host, a web application from a domain hosting the web application, or web-based presentation slides stored online at a server or locally on the presenter's computing device. In any event, the web conference content is accessed or run from the presenter's browser. The method 700 can integrate a script by using a simple script tagging with markup, by using a bookmark, or by using a browser extension, whatever technique the presenter chooses. Then, the trigger of what web conference content will be copied is quite flexible. For example, conference attendees can be provided with a keyboard shortcut or a button so that every time a host (or current presenter if not the host) switches a slide of web-based presentation, the method 700 automatically grabs the contents of the new slide which is going to be shown during the web conference. Method 700 is flexible enough so that it can trigger data extraction (e.g., text extraction) for any conference content currently being presented. In order to be able to transfer the information from the web browser into the web conference application, which can also be running in a web browser, method 700 uses an iFrame that runs under the same domain as the web conference application. The iFrame is a hidden frame, not visible to the user of the browser. As would be readily apparent to one of ordinary skill in the art, an iFrame can hold documents or information on different servers, and an iFrame can be used to display content (e.g., plugins or banners) on third party websites.

As described below with reference to FIG. 7, method 700 provides a special URL (e.g., a bookmarklet) which gives a conference participant access to the local storage of their browser. The bookmarklet is a bookmark stored in the conference participant's web browser. The bookmarklet can contain JavaScript commands that add new features to the browser. By sending information from the web-based slides, which run in the presentation through the iFrame, the inner iFrame is able to grab this information as extracted data and store it into a browser's local storage. For example, the inner iFrame can be configured to access the browser's local storage. In some embodiments, the presentation is run through the iFrame over a browser application-programming interface (API). According to certain embodiments, the browser API is a web messaging or cross-document messaging API that allows web documents to communicate with one another across different origins, or source domains. For example, a postMessage method call can be used to send plain text messages from one domain to another.

The example method of FIG. 7 starts at operation 702, where a web conference participant may access a web conference application from a browser. As shown in the example of FIG. 7, operation 702 can comprise opening Adobe® Connect™ in a web browser.

At operation 704, the conference content is opened in the browser. As depicted in FIG. 7, operation 704 can comprise opening an HTML presentation in the host's browser session.

Next, at operation 706, the web conference application may inject a hidden, clipboard iFrame into the conference content (e.g., the HTML presentation) with a bookmarklet. As shown in FIG. 7, in an example embodiment where the web conference application is Adobe® Connect™, operation 704 can comprise using bookmarklet http:/my.adobe-connect.com/clipboard.html.

At operation 708, a selection of a portion of the conference content is received. As depicted in FIG. 7, operation 708 can comprise receiving a selection of text from a conference participant. In some embodiments, operation 708 can include receiving a selection from a conference host or presenter. Then, at operation 710, the web conference application may initiate a copy/paste operation. As shown in FIG. 7, the selection made by the participant at operation 708 can trigger the copy/paste operation.

At operation 712, the selection is sent to the iFrame. According to certain embodiments, operation 712 can comprise using a browser API such as a web messaging or cross-document messaging API that allows documents to communicate with one another across different source domains. In the example of FIG. 7, operation 712 includes using a postMessage method call to send a message regarding the selection.

At operation 714, the selection is received at the iFrame. In the example provided in FIG. 7, the selection is received at the clipboard.html iFrame. Then, at operation 716, the current selection is stored in local storage under the domain of the web conference. In one non-limiting example, when the web conference application is Adobe® Connect™, operation 716 will store the current selection in local storage under the adobeconnect.com domain.

Next, at operation 718, the browser fires or initiates a storage event in the web conference window. With reference to FIG. 5, operation 718 can be performed by the conference participant's browser firing a storage event in presentation window 506.

At operation 720, the web conference application reads content of the local storage and sends the selection through a clipboard pod. As shown, the clipboard pod of operation 720 can be a copy/paste pod. For example, with reference to FIG. 5, operation 720 can send the selection to copy/paste pod 516.

Then, at operation 722, the selection is provided to the web conference participant for one or more paste operations via the clipboard pod. This operation can be performed by displaying the selected, copied content in copy/paste pod 516 so that the participant can subsequently paste it. In one example, the selected content can include text content that can be pasted into a text file or word processing document. According to this example, if the selected text content is a URL, operation 722 can provide the URL as a selectable link that the participant can click on in order to navigate to a web page identified in the URL. In another example, the selected content can include image objects that can be pasted into a graphics application.

In some embodiments, the conference application may store content and extracted data at a server along with a record of electronic conference proceedings. As one or more of the operations 702-722 is performed, the web conference application may store information descriptive of contexts and circumstances for performing the operations as a record or metadata of an audit trail for the conference. As such, the web conference application may store a copy of the audit trail at a server and may save a copy of the record indicating portions of conference content that was selected by and provided to participants during a web conference.

By performing the example method 700 of FIG. 7, the web conference application may receive information about conference content and relevant copy/paste permissions from the host. In turn, the web conference application may determine which content is available for copy/paste functionality based on organizations and locations the host and attendees are associated with. If agreed to (e.g., pre-authorized by a host or authorized post notification by the host), the web conference application can automatically allow copy/paste operations to be performed by certain conference participants and on certain conference content. Also, the web conference application may perform the various background actions (not shown) related to method 700 including storing various metadata associated with the conference content, and distributing records of conference proceedings to required parties and entities.

Turning to FIG. 8, that figure illustrates an example for providing browser-based copy/paste support for web conference content. The example method 800 of FIG. 8 starts at operation 802, where a web conference application may receive an address/location associated with browser-based content to be shared during a web conference. As shown in FIG. 8, operation 802 can comprise receiving a URL identifying a web application or web page to be shared during the web conference. This operation may be similar to operation 704 described above with reference to FIG. 7.

At operation 804, the web conference application may provide, in a browser session, a user interface element usable to select web conference content to be copied. As shown in FIG. 8, operation 804 can comprise using a script or bookmarklet to provide a copy button to conference participants.

Then, at operation 806, the web conference application may receive, during the web conference, a selection of a portion of content to be copied. In the example of FIG. 8, this can be performed by listening for a selection of part of the content in a browser session of a conference participant.

Next, at operation 808, an iFrame may be opened under the same subdomain as web conference with a prepared storage address/location. As shown in FIG. 8, operation 808 can be performed using injected code in the browser. For example, this operation can be performed by opening a URL for clipboard storage. In a non-limiting example, when the web conference application is Adobe® Connect™, operation 808 can use the http://my.adobeconnect.com/clipboard.html subdomain. This operation may be similar to operation 706 described above with reference to FIG. 7.

At operation 810, the current selection may be received from a browser API of the participant's browser session. This operation can be performed using a web messaging or cross-document messaging browser API Then, at operation 812, responsive to the selection received at operation 810, a postMessage method call may be used to send a message indicating the selection to the iFrame across a domain. As depicted in FIG. 8, the message may be a simple JavaScript Object Notation (JSON) object and a postMessage method call. For example, a JSON object { selection: 'LOREM IPSUM' }) may be used to indicate a selection of text 'LOREM IPSUM.' As would be readily apparent to one of ordinary skill in the art, JSON is an open standard format that uses human-readable text to transmit data objects consisting of attribute-value pairs. JSON objects can be used to transmit data between a server and web application. A JSON object is an unordered associative array (e.g., an array of name/value pairs). In the example of FIG. 8, the name is 'selection' and the value is the selected text (e.g., 'LOREM IPSUM'). Operation 812 may be similar to operation 712.

At operation 814, a message is received at an iFrame that is listening for the browser session's message event, and the selection is stored in the browser's local storage. In the example of FIG. 8, operation 814 can comprise storing a current time stamp, and meta data such as a URL indicating the origin of the selected content into the browser's local storage. As shown, operation 814 can further comprise associating/tying the selected data to a subdomain. This operation may be similar to operation 714.

At operation 816, a storage event is detected, where the storage event was fired when the selected data was stored in the iFrame under the subdomain. As shown in FIG. 8, operation 816 can include processing data in the local storage. This operation may be similar to operation 718.

Next, at operation 818, the data from the local storage corresponding to the participant's selection may be provided to the participant by placing it in a virtual clipboard within a window of the participant's browser. As depicted in FIG. 8, operation 818 can be performed by displaying the data in a window of a copy/paste pod. This operation may be similar to operation 722.

Example Computer System Implementation

Figure 9:
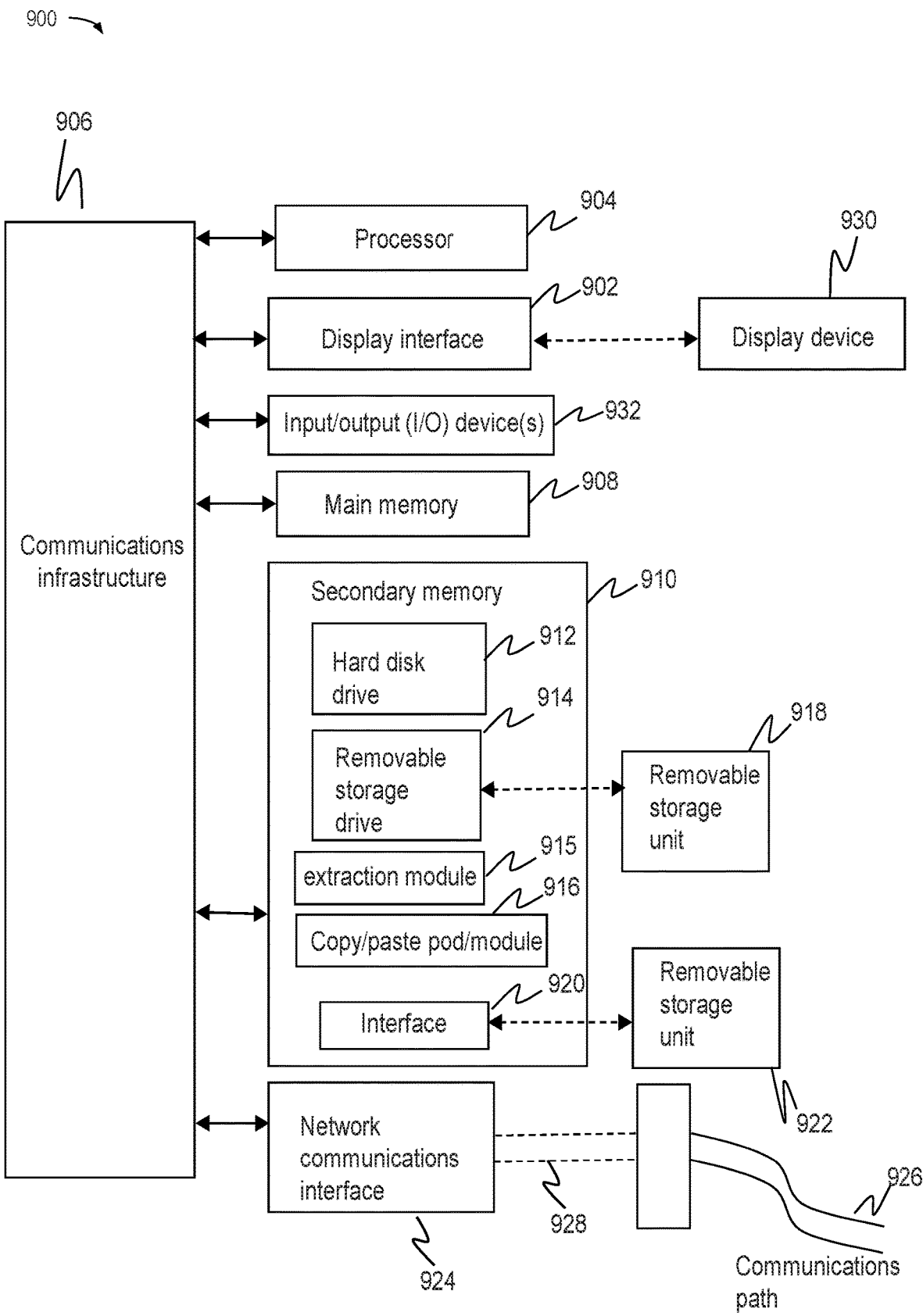
FIG. 9 is a diagram of an exemplary computer system in which embodiments of the present disclosure can be implemented.

Although example embodiments have been described in terms of apparatuses, systems, services, and methods, it is contemplated that certain functionality described herein may be implemented in software on microprocessors, such as a microprocessor chip included in computing devices such as the computer system 900 illustrated in FIG. 9. In various embodiments, one or more of the functions of the various components may be implemented in software that controls a computing device, such as computer system 900, which is described below with reference to FIG. 9.

To implement the various features and functions described above, some or all elements of the computing devices (e.g., computing devices 103a and 103b) and servers (e.g., host system 104) may be implemented using elements of the computer system of FIG. 9. More particularly, FIG. 9 illustrates an example computer system 900 for implementing the techniques in accordance with the present disclosure.

Aspects of the present invention shown in FIGS. 1-8, or any part(s) or function(s) thereof, may be implemented using hardware, software modules, firmware, tangible computer readable media having logic or instructions stored thereon, or a combination thereof and may be implemented in one or more computer systems or other processing systems.

FIG. 9 illustrates an example computer system 900 in which embodiments of the present invention, or portions thereof, may be implemented as computer-readable instructions or code. For example, some functionality performed by the computing devices 103a and 103b, and host system 102 shown in FIG. 1 can be implemented in the computer system 900 using hardware, software, firmware, non-transitory computer readable media having instructions stored thereon, or a combination thereof and may be implemented in one or more computer systems or other processing systems. Hardware, software, or any combination of such may embody certain modules and components used to implement steps in the workflow 400 illustrated by FIG. 4 discussed above. Similarly, hardware, software, or any combination of such may embody certain modules and components used to implement steps in the flowcharts illustrated by FIGS. 6-8 discussed above.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above-described embodiments. A processor device may be a single processor, a plurality of processors, or combinations thereof. Processor devices may have one or more processor "cores."

Various embodiments of the invention are described in terms of this example computer system 900. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 904 may be a special purpose or a general-purpose processor device. As will be appreciated by persons skilled in the relevant art, processor device 904 may also be a single processor in a multi-core/multiprocessor system, such system operating alone, or in a cluster of computing devices operating in a cluster or server farm. Processor device 904 is connected to a communication infrastructure 906, for example, a bus, message queue, network, or multi-core message-passing scheme. In certain embodiments, the processors 118a, 118b, 106 of one or more of the computing devices 103a and 103b and host system 102 described above with reference to FIG. 1 can be embodied as the processor device 904 shown in FIG. 9.

Computer system 900 also includes a main memory 908, for example, random access memory (RAM), and may also include a secondary memory 910. Secondary memory 910 may include, for example, a hard disk drive 912, removable storage drive 914. Removable storage drive 914 may comprise a floppy disk drive, a magnetic tape drive, an optical disk drive, a flash memory, or the like. In non-limiting embodiments, one or more of the memories 120a, 120b, and

108 of computing devices 103a and 103b and host system 102 of FIG. 1 can be embodied as the main memory 908 shown in FIG. 9.

The removable storage drive 914 reads from and/or writes to a removable storage unit 918 in a well-known manner. Removable storage unit 918 may comprise a floppy disk, magnetic tape, optical disk, etc. which is read by and written to by removable storage drive 914. As will be appreciated by persons skilled in the relevant art, removable storage unit 918 includes a non-transitory computer readable storage medium having stored therein computer software and/or data.

In alternative implementations, secondary memory 910 may include other similar means for allowing computer programs or other instructions to be loaded into computer system 900. Such means may include, for example, a removable storage unit 922 and an interface 920. Examples of such means may include a program cartridge and cartridge interface (such as that found in video game devices), a removable memory chip (such as an EPROM, or EEPROM) and associated socket, and other removable storage units 922 and interfaces 920 which allow software and data to be transferred from the removable storage unit 922 to computer system 900. Secondary memory 910 may further include an extraction module 915 and a copy/paste pod 916. As shown in FIG. 9, in an embodiment, copy/paste pod 916 may be implemented as a module. In some embodiments, one or more of the extraction module 115 and copy/paste pod 116 of FIG. 1 can be embodied as the extraction module 915 and copy/paste pod 916, respectively.

Computer system 900 may also include a communications interface 924. Communications interface 924 allows software and data to be transferred between computer system 900 and external devices. Communications interface 924 may include a modem, a network interface (such as an Ethernet card), a communications port, a PCMCIA slot and card, or the like. Software and data transferred via communications interface 924 may be in the form of signals, which may be electronic, electromagnetic, optical, or other signals capable of being received by communications interface 924. These signals may be provided to communications interface 924 via a communications path 926. Communications path 926 carries signals and may be implemented using wire or cable, fiber optics, a phone line, a cellular phone link, an RF link or other communications channels. As shown, computer system 900 may further include one or more input/output (I/O) devices 932. In certain embodiments, one or more of the display devices 126a, 126b, audio input devices 127a, 127b, and video input devices 128a, 128b of FIG. 1 can be embodied as the I/O devices 932 shown in FIG. 9.

As used herein the terms "computer readable medium" and "non-transitory computer readable medium" are used to generally refer to media such as memories, such as main memory 908 and secondary memory 910, which can be memory semiconductors (e.g., DRAMs, etc.). Computer readable medium and non-transitory computer readable medium can also refer to removable storage unit 918, removable storage unit 922, and a hard disk installed in hard disk drive 912. Signals carried over communications path 926 can also embody the logic described herein. These computer program products are means for providing software to computer system 900.

Computer programs (also called computer control logic) are stored in main memory 908 and/or secondary memory 910. Computer programs may also be received via communications interface 924. Such computer programs, when executed, enable computer system 900 to implement the present invention as discussed herein. In particular, the computer programs, when executed, enable processor device 904 to implement the processes of the present invention, such as the steps in the methods illustrated by the flowcharts of FIGS. 5-8, discussed above. Accordingly, such computer programs represent controllers of the computer system 900. Where the invention is implemented using software, the software may be stored in a computer program product and loaded into computer system 900 using removable storage drive 914, interface 920, and hard disk drive 912, or communications interface 924.

In an embodiment, display devices 126a, 126b used to display interfaces of computing devices 103a and 103b may be the computer display 930 shown in FIG. 9. The computer display 930 of computer system 900 can be implemented as a touch sensitive display (i.e., a touch screen). For example, the computer display 930 can be used to display components of a conferencing session, such as a video component, a shared desktop interface, and a chat window. Also, for example, computer display 930 can be used to display web conference content and selected portions of the content to be copied and pasted.

Embodiments of the invention also may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.), and communication mediums (e.g., wired and wireless communications networks, local area networks, wide area networks, intranets, etc.).

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A computer-implemented method comprising:
   receiving, at a web conference application hosted by a server, web conference content to be shared during a web conference by a host of the web conference with a participant using a participant device having access to the web conference application;
   inserting, by the web conference application, code into the web conference content for creating a hidden frame in a browser of the participant device;
   providing, by the web conference application to the browser of the participant device, a clipboard interface usable to perform editing operations on portions of the web conference content selected by the participant;
   receiving, by the web conference application an indication of a selection of a portion of the web conference content to be copied; and
   transmitting, by the web conference application to the hidden frame, editable data representing the selected portion of the web conference content;
   wherein the hidden frame causes the editable data to be stored in local storage of the browser and an event to be invoked that causes the editable data to be provided to the clipboard interface for performance of the editing operations by the participant.

2. The computer-implemented method of claim 1, wherein the web conference content is an electronic document received prior to the web conference.

3. The computer-implemented method of claim 1, further comprising:
   analyzing the web conference content to identify textual data items in the web conference content; and
   extracting the textual data items from the web conference content.

4. The computer-implemented method of claim 1, further comprising:
   analyzing the web conference content to identify video content in the web conference content; and
   extracting one or more of (i) video content or (ii) an image object from the web conference content.

5. The computer-implemented method of claim 1, further comprising:
   analyzing the web conference content to identify audio content;
   filtering the audio content in real time to produce filtered audio data; and
   executing a speech recognition module to identify and extract one or more words in the filtered audio data.

6. The computer-implemented method of claim 1, wherein the web conference content is a webpage accessed via a web browser and shared with the participant device during the web conference.

7. The computer-implemented method of claim 1, wherein receiving the indication of a selection of a portion comprises receiving an input from the participant device, the input indicating that the selected portion of the web conference content is to be copied into a clipboard that is accessible by the participant device.

8. The computer-implemented method of claim 1, wherein the editing operations comprise pasting the editable data from the clipboard interface to another document.

9. A system for hosting a web conference application, the system comprising:
   a processor; and
   a memory having executable instructions stored thereon, that, if executed by the processor, cause the system to perform operations comprising:
      receiving, at a web conference application hosted by a server, web conference content to be shared during a web conference by a host of the web conference with a participant using a participant device having access to the web conference application;
      inserting, by the web conference application, code into the web conference content for creating a hidden frame in a browser of the participant device;
      providing, by the web conference application to the browser of the participant device, a clipboard interface usable to perform editing operations on portions of the web conference content selected by the participant;
      receiving, by the web conference application an indication of a selection of a portion of the web conference content to be copied; and
      transmitting, by the web conference application to the hidden frame, editable data representing the selected portion of the web conference content;
      wherein the hidden frame causes the editable data to be stored in local storage of the browser and an event to be invoked that causes the editable data to be provided to the clipboard interface for performance of the editing operations by the participant.

10. The system of claim 9, wherein the web conference content is an electronic document received prior to the web conference.

11. The system of claim 9, wherein the operations further comprise:
   analyzing the web conference content to identify textual data items in the web conference content; and
   extracting the textual data items from the web conference content.

12. The system of claim 9, wherein the operations further comprise:
analyzing the web conference content to identify video content in the web conference content; and
extracting one or more of (i) video content or (ii) an image object from the web conference content.

13. The system of claim 9, wherein the operations further comprise:
analyzing the web conference content to identify audio content;
filtering the audio content in real time to produce filtered audio data; and
executing a speech recognition module to identify and extract one or more words in the filtered audio data.

14. The system of claim 9, wherein the editing operations comprise pasting the editable data from the clipboard interface to another document.

15. A non-transitory computer readable storage medium having executable instructions stored thereon, that, when executed by a computing device, cause the computing device to perform operations for facilitating copy/paste operations for web conference content, the instructions comprising:
receiving, at a web conference application hosted by a server, web conference content to be shared during a web conference by a host of the web conference with a participant using a participant device having access to the web conference application;
inserting, by the web conference application, code into the web conference content for creating a hidden frame in a browser of the participant device;
providing, by the web conference application to the browser of the participant device, a clipboard interface usable to perform editing operations on portions of the web conference content selected by the participant;
receiving, by the web conference application an indication of a selection of a portion of the web conference content to be copied; and
transmitting, by the web conference application to the hidden frame, editable data representing the selected portion of the web conference content;
wherein the hidden frame causes the editable data to be stored in local storage of the browser and an event to be invoked that causes the editable data to be provided to the clipboard interface for performance of the editing operations by the participant.

16. The non-transitory computer-readable storage medium of claim 15, wherein the web conference content is an electronic document received prior to the web conference.

17. The non-transitory computer-readable storage medium of claim 15, wherein the operations further comprise:
analyzing the web conference content to identify textual data items in the web conference content; and
extracting the textual data items from the web conference content.

18. The non-transitory computer-readable storage medium of claim 15, wherein the operations further comprise:
analyzing the web conference content to identify video content in the web conference content; and
extracting one or more of (i) video content or (ii) an image object from the web conference content.

19. The non-transitory computer-readable storage medium of claim 15, wherein the operations further comprise:
analyzing the web conference content to identify audio content;
filtering the audio content in real time to produce filtered audio data; and
executing a speech recognition module to identify and extract one or more words in the filtered audio data.

20. The non-transitory computer-readable storage medium of claim 15, wherein the web conference content is a webpage accessed via a web browser and shared with the participant device during the web conference.

* * * * *